US012552635B2

(12) United States Patent
Gupta et al.

(10) Patent No.: US 12,552,635 B2
(45) Date of Patent: Feb. 17, 2026

(54) FLOOR IDENTIFICATION USING MAGNETIC SIGNATURE REFERENCING AND SENSOR FUSION

(71) Applicant: OTIS ELEVATOR COMPANY, Farmington, CT (US)

(72) Inventors: Ankit Anand Gupta, Uttar Pradesh (IN); Frank Higgins, Burlington, CT (US); Sanket Mhadgut, Mumbai (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1225 days.

(21) Appl. No.: 17/400,838

(22) Filed: Aug. 12, 2021

(65) Prior Publication Data
US 2022/0106158 A1    Apr. 7, 2022

(30) Foreign Application Priority Data

Oct. 6, 2020   (IN) .............................. 202011043382

(51) Int. Cl.
B66B 1/34      (2006.01)
G01R 33/02     (2006.01)

(52) U.S. Cl.
CPC ............ B66B 1/3492 (2013.01); G01R 33/02 (2013.01)

(58) Field of Classification Search
CPC ........ B66B 1/3492; B66B 3/02; B66B 5/0018
See application file for complete search history.

(56) References Cited

U.S. PATENT DOCUMENTS

| | | | |
|---|---|---|---|
| 5,625,175 A * | 4/1997 | Gutknecht ............ | E05F 15/643 318/265 |
| 7,546,903 B2 * | 6/2009 | Kattainen ............. | B66B 1/3492 187/316 |
| 8,712,686 B2 | 4/2014 | Bandyopadhyay et al. | |
| 8,718,672 B2 | 5/2014 | Xie et al. | |
| 9,151,621 B2 | 10/2015 | Haverinen | |
| 9,181,065 B2 * | 11/2015 | Schumacher ......... | B66B 5/0087 |

(Continued)

FOREIGN PATENT DOCUMENTS

| | | |
|---|---|---|
| CN | 104386552 A | 3/2015 |
| CN | 104977006 A | 10/2015 |

(Continued)

OTHER PUBLICATIONS

Imran Ashraf et al.; "Floor Identification Using Magnetic Field Data with Smartphone Sensors"; Sensors 2019; 19; pp. 1-23.

*Primary Examiner* — Rina I Duda
(74) *Attorney, Agent, or Firm* — CANTOR COLBURN LLP

(57) ABSTRACT

A method of monitoring a conveyance apparatus within a conveyance system including: detecting, using a magnetometer, a first magnetic signature within the conveyance system at a first time, the magnetometer being attached to the conveyance apparatus; comparing the first magnetic signature detected to a plurality of magnetic signatures contained in a magnetic signature lookup table, wherein each of the plurality of magnetic signatures in the magnetic signature lookup table are assigned to a specific location along a conveyance path of the conveyance system; and determining a location of the conveyance apparatus at the first time by matching the first magnetic signature to one of the plurality of magnetic signatures.

11 Claims, 4 Drawing Sheets

(56) References Cited

U.S. PATENT DOCUMENTS

| | | | |
|---|---|---|---|
| 9,326,103 | B2 | 4/2016 | Shen et al. |
| 9,476,717 | B2 | 10/2016 | Haverinen et al. |
| 9,664,521 | B2 | 5/2017 | Funk et al. |
| 9,730,029 | B2 | 8/2017 | Choudhury et al. |
| 9,832,617 | B1 | 11/2017 | Mayor |
| 9,873,590 | B2 | 1/2018 | Salmikuukka et al. |
| 9,950,899 | B2 | 4/2018 | Mattsson et al. |
| 9,958,250 | B2 * | 5/2018 | Reilio ................ G01P 3/42 |
| 10,111,197 | B2 | 10/2018 | Ronen |
| 10,165,422 | B2 | 12/2018 | Huberman et al. |
| 10,735,897 | B2 | 8/2020 | Hamidifar et al. |
| 2014/0324381 | A1 | 10/2014 | Venkatraman et al. |
| 2015/0068850 | A1* | 3/2015 | Mattsson ............ B66B 5/0018 187/392 |
| 2015/0073748 | A1 | 3/2015 | Mattsson et al. |
| 2016/0350811 | A1 | 12/2016 | Perttunen et al. |
| 2017/0253463 | A1* | 9/2017 | Mattsson ................ B66B 9/00 |
| 2018/0229965 | A1* | 8/2018 | Kattainen ............ B66B 1/3446 |
| 2019/0010016 | A1 | 1/2019 | Witczak et al. |
| 2019/0025062 | A1 | 1/2019 | Young et al. |
| 2019/0382237 | A1 | 12/2019 | Witczak et al. |
| 2020/0003880 | A1 | 1/2020 | Witczak et al. |
| 2020/0249026 | A1 | 8/2020 | Ivanov et al. |

FOREIGN PATENT DOCUMENTS

| | | |
|---|---|---|
| CN | 107421546 A | 12/2017 |
| CN | 109205430 A | 1/2019 |
| CN | 106500690 B | 7/2019 |
| CN | 110697526 A | 1/2020 |
| IN | 110304509 A | 10/2019 |
| WO | 2020003319 A1 | 1/2020 |
| WO | 2020005580 A1 | 1/2020 |
| WO | 2020089593 A1 | 5/2020 |

\* cited by examiner

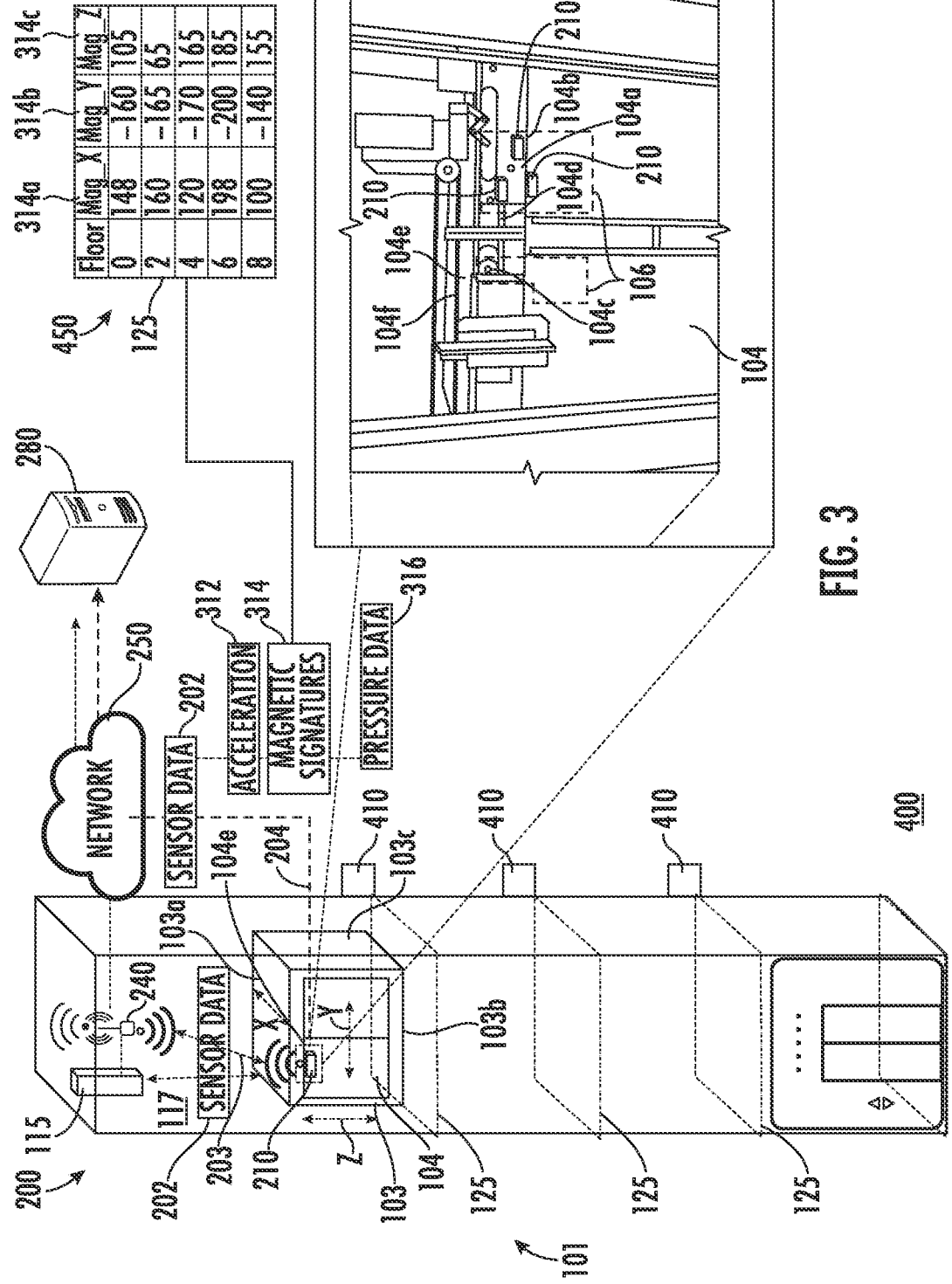

FLOOR IDENTIFICATION USING MAGNETIC SIGNATURE REFERENCING AND SENSOR FUSION

CROSS-REFERENCE TO RELATED APPLICATIONS

This application claims the benefit of Indian patent application serial number 202011043382 filed Oct. 6, 2020, the disclosure of which is incorporated herein by reference in its entirety.

BACKGROUND

The embodiments herein relate to the field of conveyance systems, and specifically to a method and apparatus for monitoring a position of a conveyance apparatus of a conveyance system.

A position of a conveyance apparatus within a conveyance systems, such as, for example, elevator systems, escalator systems, and moving walkways is often difficult to determine.

BRIEF SUMMARY

According to an embodiment, a method of monitoring a conveyance apparatus within a conveyance system is provided. The method including: detecting, using a magnetometer, a first magnetic signature within the conveyance system at a first time, the magnetometer being attached to the conveyance apparatus; comparing the first magnetic signature detected to a plurality of magnetic signatures contained in a magnetic signature lookup table, wherein each of the plurality of magnetic signatures in the magnetic signature lookup table are assigned to a specific location along a conveyance path of the conveyance system; and determining a location of the conveyance apparatus at the first time by matching the first magnetic signature to one of the plurality of magnetic signatures.

In addition to one or more of the features described herein, or as an alternative, further embodiments may include: conducting a learn run through the conveyance path to learn the plurality of magnetic signatures contained in the magnetic signature lookup table.

In addition to one or more of the features described herein, or as an alternative, further embodiments may include that the learn run further includes: stopping at each of a plurality of specific locations along the conveyance path to learn a magnetic signature at each of the plurality of specific locations for the magnetic signature lookup table.

In addition to one or more of the features described herein, or as an alternative, further embodiments may include: tracking an acceleration of the conveyance apparatus of a selected period of time including the first time or tracking a pressure data of the conveyance apparatus of a selected period of time including the first time; determining a plurality of locations of the conveyance apparatus over the selected period of time based on the acceleration or the pressure data; and confirming the location of the conveyance apparatus at the first time using the plurality of locations of the conveyance apparatus over the selected period of time that was determined based on the acceleration or the pressure data.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the conveyance path is an elevator shaft of the elevator system.

In addition to one or more of the features described herein, or as an alternative, further embodiments may include that the first magnetic signature is emitted from the earth.

In addition to one or more of the features described herein, or as an alternative, further embodiments may include that the first magnetic signature is emitted from magnet placed along the conveyance path.

In addition to one or more of the features described herein, or as an alternative, further embodiments may include that the first magnetic signature is emitted from magnet placed along the elevator shaft.

In addition to one or more of the features described herein, or as an alternative, further embodiments may include that the specific location along a conveyance path of the conveyance system is a landing.

According to another embodiment, a sensing apparatus for monitoring a conveyance apparatus within a conveyance system is provided. The sensing apparatus including: a processor; and a memory including computer-executable instructions that, when executed by the processor, cause the processor to perform operations, the operations including: detecting, using a magnetometer, a first magnetic signature within the conveyance system at a first time, the magnetometer being attached to the conveyance apparatus; comparing the first magnetic signature detected to a plurality of magnetic signatures contained in a magnetic signature lookup table, wherein each of the plurality of magnetic signatures in the magnetic signature lookup table are assigned to a specific location along a conveyance path of the conveyance system; and determining a location of the conveyance apparatus at the first time by matching the first magnetic signature to one of the plurality of magnetic signatures.

In addition to one or more of the features described herein, or as an alternative, further embodiments may include that the operations further include: conducting a learn run through the conveyance path to learn the plurality of magnetic signatures contained in the magnetic signature lookup table.

In addition to one or more of the features described herein, or as an alternative, further embodiments may include that the learn run further includes: stopping at each of a plurality of specific locations along the conveyance path to learn a magnetic signature at each of the plurality of specific locations for the magnetic signature lookup table.

In addition to one or more of the features described herein, or as an alternative, further embodiments may include that the operations further include: tracking an acceleration of the conveyance apparatus of a selected period of time including the first time or tracking pressure data of the conveyance apparatus of a selected period of time including the first time; determining a plurality of locations of the conveyance apparatus over the selected period of time based on the acceleration or the pressure data; and confirming the location of the conveyance apparatus at the first time using the plurality of locations of the conveyance apparatus over the selected period of time that was determined based on the acceleration or the pressure data.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the conveyance path is an elevator shaft of the elevator system.

In addition to one or more of the features described herein, or as an alternative, further embodiments may include that the first magnetic signature is from the earth impacted by ferromagnetic content of beams and columns used in the building structure.

In addition to one or more of the features described herein, or as an alternative, further embodiments may include that the first magnetic signature is emitted from magnet placed along the conveyance path.

In addition to one or more of the features described herein, or as an alternative, further embodiments may include that the first magnetic signature is emitted from magnet placed along the elevator shaft.

According to another embodiment, a computer program product tangibly embodied on a computer readable medium is provided. The computer program product including instructions that, when executed by a processor, cause the processor to perform operations including: detecting, using a magnetometer, a first magnetic signature within a conveyance system at a first time, the magnetometer being attached to a conveyance apparatus of the conveyance system; comparing the first magnetic signature detected to a plurality of magnetic signatures contained in a magnetic signature lookup table, wherein each of the plurality of magnetic signatures in the magnetic signature lookup table are assigned to a specific location along a conveyance path of the conveyance system; and determining a location of the conveyance apparatus at the first time by matching the first magnetic signature to one of the plurality of magnetic signatures.

Technical effects of embodiments of the present disclosure include detecting a location of the elevator car through magnetic signatures.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 2 is a schematic illustration of a sensor system for the elevator system of FIG. 1, in accordance with an embodiment of the disclosure;

FIG. 3 is a schematic illustration of the location of sensing apparatus of the sensor system of FIG. 2, in accordance with an embodiment of the disclosure;

DETAILED DESCRIPTION

Conveyance systems, such as, for example, elevator systems, escalator systems, and moving walkways may require positional monitoring to determine the location of the elevator apparatus at a given moment in time. Embodiments disclosed herein seek to address this issue through the use of magnetism.

Figure 1:
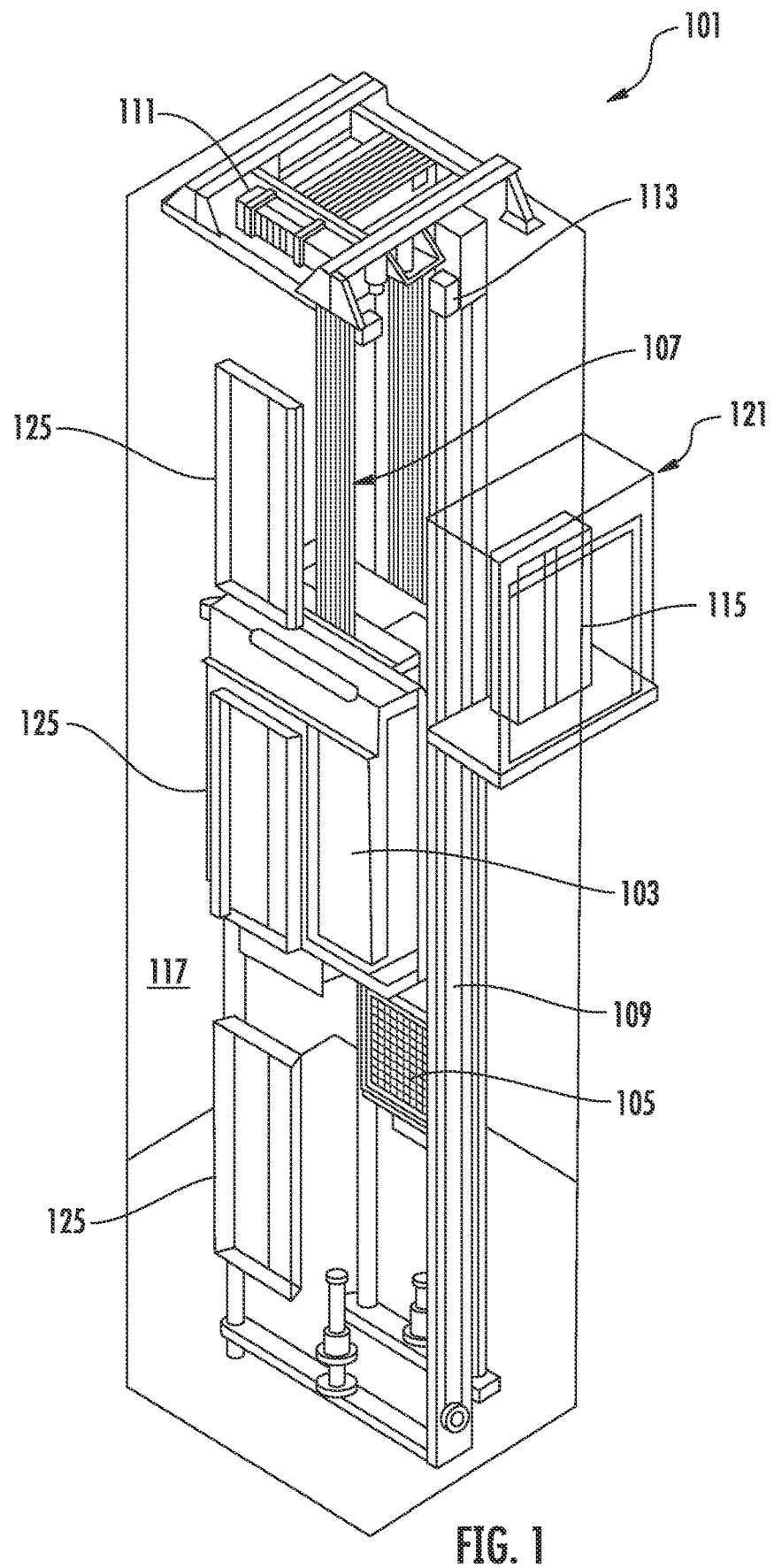
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 (e.g., floors) as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Referring now to FIG. 2, with continued referenced to FIG. 1, a view of a sensor system 200 including a sensing apparatus 210 is illustrated, according to an embodiment of the present disclosure. The sensing apparatus 210 is configured to detect sensor data 202 of the elevator car 103 and transmit the sensor data 202 to a remote device 280. The sensing apparatus 210 may be utilized in conjunction with the position reference system 113 or the sensing apparatus 210 may replace the position reference system 113. Sensor data 202 may include but is not limited to magnetic signatures 314, pressure data 316, vibratory signatures (i.e., vibrations over a period of time) or accelerations 312 and derivatives or integrals of accelerations 312 of the elevator car 103, such as, for example, distance, velocity, jerk, jounce, snap . . . etc. The magnetic signatures 314 may include magnetic signatures 314 detected within the elevator shaft 117 from the earth 400 and/or magnets of varying or same strength 410 placed along the elevator shaft 117. Each landing 125 may have a different magnetic signature 314 from the earth 400 impacted by ferromagnetic content of beams and columns used in the building structure. During a learn run a magnetic signature 314 of each landing 125 along the elevator shaft 117 may be detected and saved in a magnetic signature lookup table 450. Each magnetic signature 314 may be broken down into an X-magnetic signature component 314a, a Y-magnetic signature component 314d, and a Z-magnetic signature component 314c for each landing 125. The magnetic signature lookup table 450 may be saved locally on the sensing apparatus 210 and/or the controller 115 of the elevator system 101. Alternatively, or additionally, the magnetic signature lookup table 450 may be saved on the network 250 or the remote device 280.

The pressure data 316 may include atmospheric air pressure within the elevator shaft 117. It should be appreciated that, although particular systems are separately defined in the schematic block diagrams, each or any of the systems may be otherwise combined or separated via hardware and/or software. For example, the sensing apparatus 210 may be a single sensor or may be multiple separate sensors that are interconnected.

In the event that a magnetic signature 314 of the earth 400 cannot be detected at a landing 125 or cannot be differentiated amongst multiple landings 125, a magnet 410 may be placed at that location along the elevator shaft 117. Alternatively, magnets 410 may be placed at every landing 125 along the elevator shaft 117 and the magnetic signature 314 of the magnets 410 may be detected by the sensing apparatus rather than the magnetic signature 314 of the earth 400.

It should be appreciated that, although particular systems are separately defined in the schematic block diagrams, each or any of the systems may be otherwise combined or separated via hardware and/or software. For example, the sensing apparatus 210 may be a single sensor or may be multiple separate sensors that are interconnected wirelessly or through wires (e.g., a separate acceleration sensor and a separate magnetometer).

In an embodiment, the sensing apparatus 210 is configured to transmit sensor data 202 that is raw and unprocessed to the controller 115 of the elevator system 101 for processing. In another embodiment, the sensing apparatus 210 is configured to process the sensor data 202 prior to transmitting the sensor data 202 to the controller 115 (i.e., edge processing). In another embodiment, the sensing apparatus 210 is configured to transmit sensor data 202 that is raw and unprocessed to a remote device 280 for processing. In yet another embodiment, the sensing apparatus 210 is configured to process the sensor data 202 prior to transmitting the sensor data 202 to the remote device 280 (i.e., edge processing).

The processing of the sensor data 202 may also reveal data, such as, for example, a number of elevator door openings/closings, elevator door time, vibrations, vibratory signatures, a number of elevator rides, elevator ride performance, elevator flight time, probable car position (e.g. elevation, floor number), releveling events, rollbacks, elevator car 103 x, y acceleration at a position: (i.e., rail topology), elevator car 103 x, y vibration signatures at a position: (i.e., rail topology), door performance at a landing number, nudging event, vandalism events, emergency stops, etc.

The remote device 280 may be a computing device, such as, for example, a desktop or cloud computer. The remote device 280 may also be a mobile computing device that is typically carried by a person, such as, for example a smartphone, PDA, smartwatch, tablet, laptop, etc. The remote device 280 may also be two separate devices that are synced together, such as, for example, a cellular phone and a desktop computer synced over an internet connection. The remote device 280 may also be a cloud computing network.

The sensing apparatus 210 is configured to transmit the sensor data 202 to the controller 115 or the remote device 280 via short-range wireless protocols 203 and/or long-range wireless protocols 204. Short-range wireless protocols 203 may include but are not limited to Bluetooth, Wi-Fi, HaLow (801.11ah), Wireless M-Bus, zWave, Zigbee, or other short-range wireless protocol known to one of skill in the art. Using short-range wireless protocols 203, the sensing apparatus 210 is configured to transmit the sensor data 202 to directly to the controller 115 or to a local gateway device 240 and the local gateway device 240 is configured to transmit the sensor data 202 to the remote device 280 through a network 250 or to the controller 115. The network 250 may be a computing network, such as, for example, a cloud computing network, cellular network, or any other computing network known to one of skill in the art. Using long-range wireless protocols 204, the sensing apparatus 210 is configured to transmit the sensor data 202 to the remote device 280 through a network 250. Long-range wireless protocols 204 may include but are not limited to cellular, LTE (NB-IoT, CAT M1), LoRa, Ingenu, SigFox, Satellite, or other long-range wireless protocol known to one of skill in the art.

The sensing apparatus 210 may be configured to detect sensor data 202 including accelerations 312 or magnetic signatures 314 in any number of directions. In an embodiment, the sensing apparatus 210 may detect sensor data 202 including accelerations 312 along three axis, an X axis, a Y axis, and a Z axis, as show in in FIG. 2. The X axis may be perpendicular to the doors 104 of the elevator car 103, as shown in FIG. 2. The Y axis may be parallel to the doors 104 of the elevator car 103, as shown in FIG. 2. The Z axis may be aligned vertically parallel with the elevator shaft 117 and pull of gravity, as shown in FIG. 2. Vibratory signatures may be generated along the X axis and the Y axis as the elevator car 103 moves along the Z-axis.

The sensing apparatus 210 may also be located on a top 103a of the elevator car 103, a bottom 103b of the elevator car 103, and any side wall 103c of the elevator car 103.

FIG. 3 shows additional possible installation locations of the sensing apparatus 210 within the elevator system 101. The sensing apparatus 210 may include a magnet (not show) to removably attach to the elevator car 103. In the illustrated embodiment shown in FIG. 3, the sensing apparatus 210 may be installed on the door hanger 104a and/or the door 104 of the elevator system 101. It is understood that the sensing apparatus 210 may also be installed in other locations other than the door hanger 104a and the door 104 of the elevator system 101. It is also understood that multiple sensing apparatus 210 are illustrated in FIG. 3 to show various locations of the sensing apparatus 210 and the embodiments disclosed herein may include one or more sensing apparatus 210. In another embodiment, the sensing apparatus 210 may be attached to a door header 104e of a door 104 of the elevator car 103. In another embodiment, the sensing apparatus 210 may be located on a door header 104e proximate a top portion 104f of the elevator car 103. In another embodiment, the sensing apparatus 210 is installed elsewhere on the elevator car 103, such as, for example, directly on the door 104.

As shown in FIG. 3, the sensing apparatus 201 may be located on the elevator car 103 in the selected areas 106, as shown in FIG. 3. The doors 104 are operably connected to the door header 104e through a door hanger 104a located proximate a top portion 104b of the door 104. The door hanger 104a includes guide wheels 104c that allow the door 104 to slide open and close along a guide rail 104d on the door header 104e. Advantageously, the door hanger 104a is an easy to access area to attach the sensing apparatus 210 because the door hanger 104a is accessible when the elevator car 103 is at landing 125 and the elevator door 104 is open. Thus, installation of the sensing apparatus 210 is possible without taking special measures to take control over the elevator car 103. For example, the additional safety of an emergency door stop to hold the elevator door 104 open is not necessary as door 104 opening at landing 125 is a normal operation mode. The door hanger 104a also provides ample clearance for the sensing apparatus 210 during operation of the elevator car 103, such as, for example, door 104 opening and closing. Due to the mounting location of the sensing apparatus 210 on the door hanger 104a, the sensing apparatus 210 may detect open and close motions (i.e., acceleration) of the door 104 of the elevator car 103 and a door at the landing 125. Additionally, mounting the sensing apparatus 210 on the hanger 104a allows for recording of a ride quality of the elevator car 103.

Figure 4:
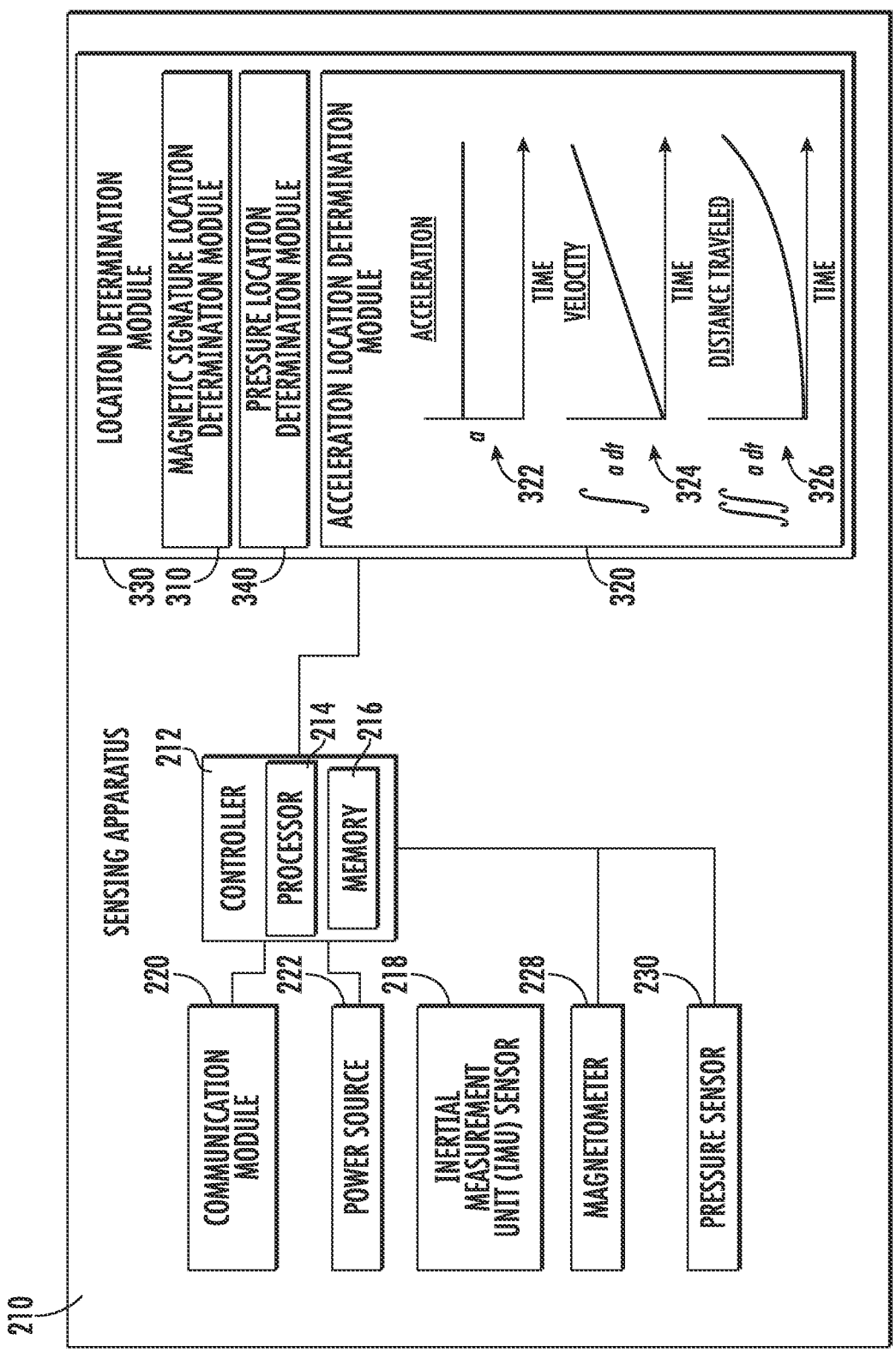
FIG. 4 is a schematic illustration of a sensing apparatus of the sensor system of FIG. 2, in accordance with an embodiment of the disclosure.

FIG. 4 illustrates a block diagram of the sensing apparatus 210 of the sensing system of FIGS. 2 and 3. It should be appreciated that, although particular systems are separately defined in the schematic block diagram of FIG. 4, each or any of the systems may be otherwise combined or separated via hardware and/or software. As shown in FIG. 4, the sensing apparatus 210 may include a controller 212, an inertial measurement unit (IMU) sensor 218 in communication with the controller 212, a magnetometer 228 in communication with the controller 212, a communication module 220 in communication with the controller 212, a power source 222 electrically connected to the controller 212, and a pressure sensor 230.

The IMU sensor 218 is configured to detect sensor data 202 including accelerations 312 of the sensing apparatus 210 and the elevator car 103 when the sensing apparatus 210 is attached to the elevator car 103. The IMU sensor 218 may be a sensor, such as, for example, an accelerometer, a gyroscope, or a similar sensor known to one of skill in the art. The accelerations 312 detected by the IMU sensor 218 may include accelerations 312 as well as derivatives or integrals of accelerations, such as, for example, velocity, jerk, jounce, snap . . . etc. The IMU sensor 218 is in communication with the controller 212 of the sensing apparatus 210. The IMU sensor 218 may work as the primary or secondary means of detecting a location of the elevator car 103.

The magnetometer 228 is configured to detect sensor data 202 including magnetic signatures 314. The magnetometer 228 is in communication with the controller 212. The magnetometer 228 may work as the primary or secondary means of detecting a location of the elevator car 103. The magnetometer 228 may work in combination with the IMU sensor 218 to detect a location of the elevator car 103.

The pressure sensor 230 is configured to detect sensor data 202 including pressure data 316, such as, for example, atmospheric air pressure within the elevator shaft 117. The pressure sensor 230 may be a pressure altimeter or barometric altimeter in two non-limiting examples. The pressure sensor 230 is in communication with the controller 212.

The controller 212 of the sensing apparatus 210 includes a processor 214 and an associated memory 216 comprising computer-executable instructions that, when executed by the processor 214, cause the processor 214 to perform various operations, such as, for example, processing the sensor data 202 collected by the IMU sensor 218, pressure sensor 230, and the magnetometer 228. In an embodiment, the controller 212 may process the accelerations 312, pressure data 316, and/or the magnetic signatures 314 in order to determine a probable location of the elevator car 103, discussed further below. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art. Alternatively, the power source 222 may be connected to the elevator system 101 to receive power.

The sensing apparatus 210 includes a communication module 220 configured to allow the controller 212 of the sensing apparatus 210 to communicate with the remote device 280 or controller 115 through at least one of short-range wireless protocols 203 and long-range wireless protocols 204. The communication module 220 may be configured to communicate with the remote device 280 using short-range wireless protocols 203. Using short-range wireless protocols 203, the communication module 220 is configured to transmit the sensor data 202 to a local gateway device 240 and the local gateway device 240 is configured to transmit the sensor data to a remote device 280 through a network 250, as described above. The communication module 220 may be configured to communicate with the remote device 280 using long-range wireless protocols 204. Using long-range wireless protocols 204, the communication module 220 is configured to transmit the sensor data 202 to a remote device 280 through a network 250. In an embodiment, the short-range wireless protocol 203 is sub GHz Wireless M-Bus. In another embodiment, the long-range wireless protocol is Sigfox. In another embodiment, the long-range wireless protocol is LTE NB-IoT or CAT M1 with 2G fallback.

The sensing apparatus 210 includes a location determination module 330 configured to determine a location (i.e., position) of the elevator car 103 within the elevator shaft 117. The location of the elevator car 103 may be fixed locations along the elevator shaft 117, such as for example, the landings 125 of the elevator shaft 117. The locations may be equidistantly spaced apart along the elevator shaft 117 or intermittently spaced apart along the elevator shaft 117.

The location determination module 330 may utilize various approaches to determine a location of the elevator car 103 within the elevator shaft 117. The location determination module 330 may be configured to determine a location of the elevator car 103 within the elevator shaft 117 using a magnetic signature location determination module 310, an acceleration location determination module 320, and/or pressure location determination module 340.

The acceleration location determination module 320 is configured to determine a distance traveled of the elevator car 103 within the elevator shaft 117 in response to the acceleration of the elevator car 103 detected along the Z axis. The sensing apparatus 210 may detect an acceleration along the Z axis shown at 322 and may integrate the acceleration to get a velocity of the elevator car 103 at 324. At 326, the sensing apparatus 210 may also integrate the velocity of the elevator car 103 to determine a distance traveled by the elevator car 103 within the elevator shaft 117 during the acceleration 312 detected at 322. The direction of travel of the elevator car 103 may also be determined in response to the acceleration 312 detected or via the pressure data 316 (e.g., a change in pressure). The location determination module 330 may then determine the location of the elevator car 103 within the elevator shaft 117 in response to a probable starting location and a distance traveled away from that probable starting location. The probable starting location may be based upon tracking the past operation and/or movement of the elevator car 103.

The magnetic signature location determination module 310 is configured to detect a magnetic signature 314 within the elevator shaft 117 when the elevator car 103 is in motion and/or stationary using the magnetometer 228. The magnetic signature 314 detected by the magnetometer 228 may be associated with a location (e.g., height, elevation) within the elevator shaft 117 through a look up table, such as, for example the magnetic signature lookup table 450 (See FIG. 2). The direction of travel of the elevator car 103 may also be determined in response to the change in magnetic signatures 314 detected via the magnetometer 228.

In one embodiment, the acceleration location determination module 320 may be used to verify and/or modify a location of the elevator car 103 within the elevator shaft 117 determined by the magnetic signature location determination module 310. In another embodiment, the magnetic signature location determination module 310 may be used to verify and/or modify a location of the elevator car 103 within the elevator shaft 117 determined by the acceleration location determination module 320. In another embodiment, the magnetic signature location determination module 310 may be prompted to determine a location of the elevator car 103 within the elevator shaft 117 in response to an acceleration detected by the IMU sensor 218. Advantageously, energy may be saved by only detecting the magnetic signature 314 after a zero velocity is detected from the acceleration profile.

The pressure location determination module 340 is configured to detect an atmospheric air pressure within the elevator shaft 117 when the elevator car 103 is in motion and/or stationary using the pressure sensor 230. The pressure detected by the pressure sensor 230 may be associated with a location (e.g., height, elevation) within the elevator shaft 117 through either a look up table or a calculation of altitude using the barometric pressure change in two non-limiting embodiments. The direction of travel of the elevator car 103 may also be determined in response to the change in pressure detected via the pressure data 316. The pressure sensor 230 may need to periodically detect a baseline pressure to account for changes in atmospheric pressure due to local weather conditions. For example, this baseline pressure may need to be detected daily, hourly, or weekly in non-limiting embodiments. In some embodiments, the baseline pressure may be detected whenever the elevator car 103 is stationary, or at certain intervals when the elevator car 103 is stationary and/or at a known location. The acceleration of the elevator car 103 may also need to be detected to know when the elevator car 103 is stationary and then when the elevator car 103 is stationary the sensing apparatus 210 may need to be offset to compensate the sensor drift and environment drift.

In one embodiment, the pressure location determination module 340 may be used to verify and/or modify a location of the elevator car 102 within the elevator shaft 117 determined by the acceleration location determination module 320 or the magnetic signature location determination module 310. In another embodiment, the acceleration location determination module 320 or the magnetic signature location determination module 310 may be used to verify and/or modify a location of the elevator car 102 within the elevator shaft 117 determined by the pressure location determination module 340. In another embodiment, the pressure location determination module 340 may be prompted to determine a location of the elevator car 103 within the elevator shaft 117 in response to an acceleration detected by the IMU sensor 218.

Figure 5:
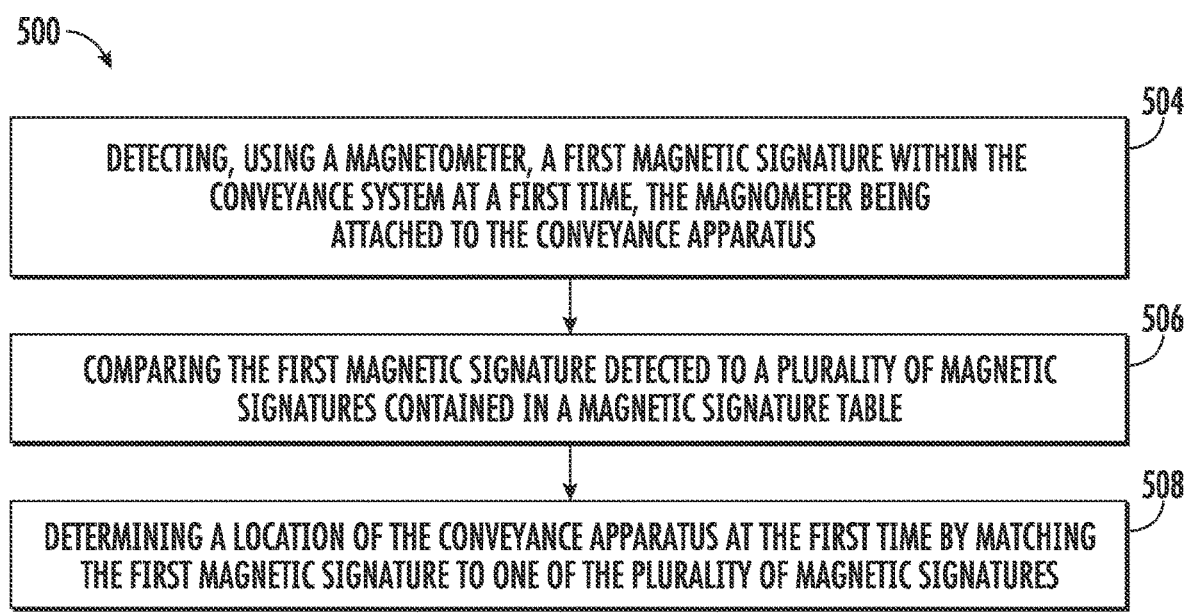
FIG. 5 is a flow chart of a method of monitoring a location of a conveyance apparatus within a conveyance system, in accordance with an embodiment of the disclosure.

Referring now to FIG. 5, while referencing components of FIGS. 1-4. FIG. 5 shows a flow chart of a method 500 of monitoring a location of a conveyance apparatus within a conveyance system, in accordance with an embodiment of the disclosure. In an embodiment, the conveyance system is an elevator system 101 and the conveyance apparatus is an elevator car 103. In an embodiment, the method 500 is performed by the sensing apparatus 210.

At block 504, a magnetometer 228 detects a first magnetic signature 314 within the conveyance system at a first time. The magnetometer 228 is attached to the conveyance apparatus.

At block 506, the first magnetic signature 314 detected is compared to a plurality of magnetic signatures 314 contained in a magnetic signature lookup table 450. Each of the plurality of magnetic signatures 314 in the magnetic signature lookup table 450 are assigned to a specific location along a conveyance path of the conveyance system.

In an embodiment, the conveyance path may be an elevator shaft 117. In another embodiment, the specific location along a conveyance path of the conveyance system is a landing 125. Alternatively, the specific location may be any desired location along the elevator shaft 117. In one embodiment, the magnetic signature 314 may be from the earth 400 and/or a magnet 410. The magnet 410 may be placed along the conveyance path of elevator shaft 117.

At block 508, a location of the conveyance apparatus at the first time by matching the first magnetic signature 314 to one of the plurality of magnetic signatures 314.

The method 500 may further comprise conducting a learn run through the conveyance path to learn the plurality of magnetic signatures 314 contained in the magnetic signature lookup table 450. The learn run further comprises: stopping at each of a plurality of specific locations along the conveyance path to learn the magnetic signature 314 at each of the plurality of specific locations for the magnetic signature lookup table 450.

The method 500 may further comprise that the location of the conveyance at the first time is verified by determining the location at the first time through acceleration 312. The method 500 further comprise the steps of: tracking an acceleration 312 of the conveyance apparatus of a selected period of time including the first time; determining a plurality of locations of the conveyance apparatus over the selected period of time based on the acceleration 312; and confirming the location of the conveyance apparatus at the first time using the plurality of locations of the conveyance apparatus over the selected period of time that was determined based on the acceleration 312.

The method 500 further comprise the steps of: tracking pressure data 316 of the conveyance apparatus of a selected period of time including the first time; determining a plurality of locations of the conveyance apparatus over the selected period of time based on the pressure data 316; and confirming the location of the conveyance apparatus at the first time using the plurality of locations of the conveyance apparatus over the selected period of time that was determined based on the pressure data 316.

Alternatively, the location of the conveyance apparatus at the first time may be determined using acceleration 312 or pressure data 318 and then verified using the magnetic signatures 314.

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of monitoring a conveyance apparatus within a conveyance system, the method comprising:
detecting, using a magnetometer, a first magnetic signature within the conveyance system at a first time, the magnetometer being attached to the conveyance apparatus;
comparing the first magnetic signature detected to a plurality of magnetic signatures contained in a magnetic signature lookup table, wherein each of the plurality of magnetic signatures in the magnetic signature lookup table are assigned to a specific location along a conveyance path of the conveyance system; and
determining a location of the conveyance apparatus at the first time by matching the first magnetic signature to one of the plurality of magnetic signatures;

wherein the conveyance system is an elevator system and the conveyance apparatus is an elevator car, wherein the conveyance path is an elevator shaft of the elevator system, and wherein the specific location along a conveyance path of the conveyance system is a landing; further comprising:

conducting a learn run through the conveyance path to learn the plurality of magnetic signatures contained in the magnetic signature lookup table;

wherein the learn run further comprises stopping at each of a plurality of specific locations along the conveyance path to learn a magnetic signature at each of the plurality of specific locations for the magnetic signature lookup table; and wherein in the event that a magnetic signature cannot be differentiated amongst multiple landings, the method further comprises placing a magnet at that location along the elevator shaft.

2. The method of claim 1, further comprising:

tracking an acceleration of the conveyance apparatus of a selected period of time including the first time or tracking a pressure data of the conveyance apparatus of a selected period of time including the first time;

determining a plurality of locations of the conveyance apparatus over the selected period of time based on the acceleration or the pressure data; and confirming the location of the conveyance apparatus at the first time using the plurality of locations of the conveyance apparatus over the selected period of time that was determined based on the acceleration or the pressure data.

3. The method of claim 1, wherein the first magnetic signature is emitted from the magnetic field of the earth.

4. The method of claim 1, wherein the first magnetic signature is emitted from magnet placed along the conveyance path.

5. The method of claim 1, wherein the first magnetic signature is emitted from magnet placed along the elevator shaft.

6. A sensing apparatus for monitoring a conveyance apparatus within a conveyance system, the sensing apparatus comprising:

a processor; and a memory comprising computer-executable instructions that, when executed by the processor, cause the processor to perform operations, the operations comprising:

detecting, using a magnetometer, a first magnetic signature within the conveyance system at a first time, the magnetometer being attached to the conveyance apparatus;

comparing the first magnetic signature detected to a plurality of magnetic signatures contained in a magnetic signature lookup table, wherein each of the plurality of magnetic signatures in the magnetic signature lookup table are assigned to a specific location along a conveyance path of the conveyance system; and determining a location of the conveyance apparatus at the first time by matching the first magnetic signature to one of the plurality of magnetic signatures;

wherein the conveyance system is an elevator system and the conveyance apparatus is an elevator car, wherein the conveyance path is an elevator shaft of the elevator system, and wherein the specific location along a conveyance path of the conveyance system is a landing;

wherein the operations further comprise:

conducting a learn run through the conveyance path to learn the plurality of magnetic signatures contained in the magnetic signature lookup table;

wherein the learn run further comprises stopping at each of a plurality of specific locations along the conveyance path to learn a magnetic signature at each of the plurality of specific locations for the magnetic signature lookup table; and wherein in the event that a magnetic signature cannot be differentiated amongst multiple landings, the method further comprises placing a magnet at that location along the elevator shaft.

7. The sensing apparatus of claim 6, wherein the operations further comprise:

tracking an acceleration of the conveyance apparatus of a selected period of time including the first time or tracking pressure data of the conveyance apparatus of a selected period of time including the first time;

determining a plurality of locations of the conveyance apparatus over the selected period of time based on the acceleration or the pressure data; and confirming the location of the conveyance apparatus at the first time using the plurality of locations of the conveyance apparatus over the selected period of time that was determined based on the acceleration or the pressure data.

8. The sensing apparatus of claim 6, wherein the first magnetic signature is from the magnetic field of the earth impacted by ferromagnetic content of beams and columns used in the building structure.

9. The sensing apparatus of claim 6, wherein the first magnetic signature is emitted from magnet placed along the conveyance path.

10. The sensing apparatus of claim 6, wherein the first magnetic signature is emitted from magnet placed along the elevator shaft.

11. A computer program product tangibly embodied on a non-transitory computer readable medium, the computer program product including instructions that, when executed by a processor, cause the processor to perform operations comprising:

detecting, using a magnetometer, a first magnetic signature within a conveyance system at a first time, the magnetometer being attached to a conveyance apparatus of the conveyance system;

comparing the first magnetic signature detected to a plurality of magnetic signatures contained in a magnetic signature lookup table, wherein each of the plurality of magnetic signatures in the magnetic signature lookup table are assigned to a specific location along a conveyance path of the conveyance system; and determining a location of the conveyance apparatus at the first time by matching the first magnetic signature to one of the plurality of magnetic signatures;

wherein the conveyance system is an elevator system and the conveyance apparatus is an elevator car, wherein the conveyance path is an elevator shaft of the elevator system, and wherein the specific location along a conveyance path of the conveyance system is a landing;

wherein the operations further comprise:

conducting a learn run through the conveyance path to learn the plurality of magnetic signatures contained in the magnetic signature lookup table;

wherein the learn run further comprises stopping at each of a plurality of specific locations along the conveyance path to learn a magnetic signature at each of the plurality of specific locations for the magnetic signature lookup table; and wherein in the event that a magnetic signature cannot be differentiated amongst multiple landings, the method further comprises placing a magnet at that location along the elevator shaft.

* * * * *